W. A. SWAN.
PUMP.
APPLICATION FILED APR. 5, 1915.
1,208,858.
Patented Dec. 19, 1916.
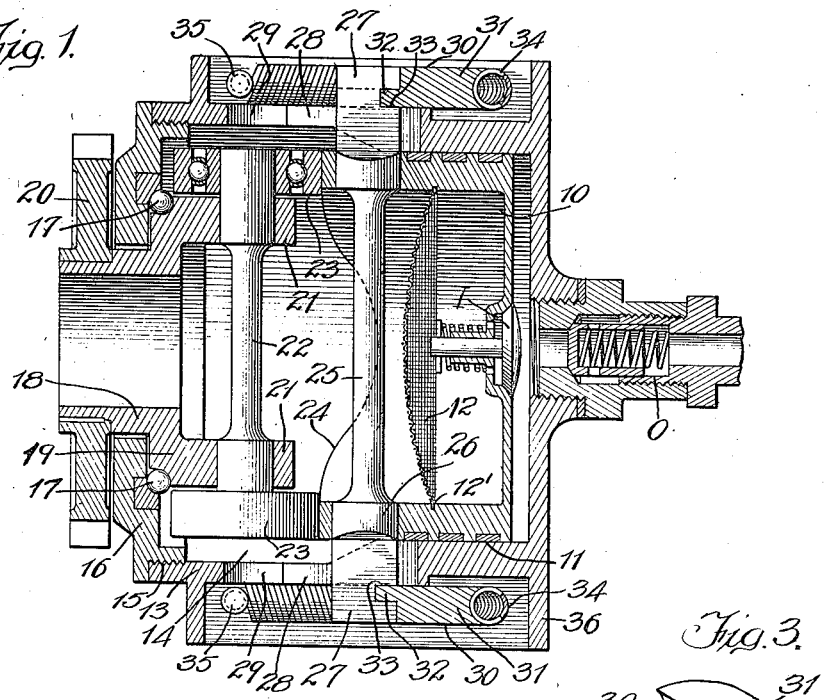
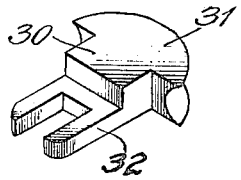
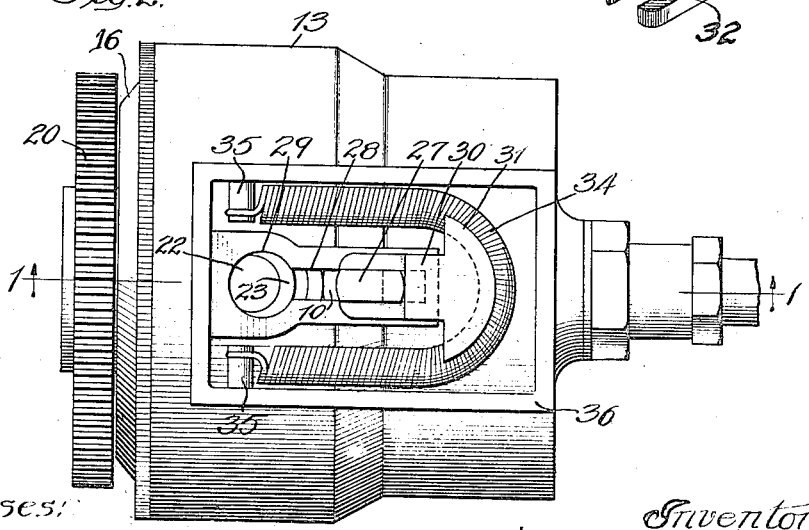

UNITED STATES PATENT OFFICE.

WILLIS A. SWAN, OF CHICAGO, ILLINOIS.

PUMP.

1,208,858.  Specification of Letters Patent.  Patented Dec. 19, 1916.

Application filed April 5, 1915. Serial No. 19,266.

*To all whom it may concern:*

Be it known that I, WILLIS A. SWAN, a citizen of the United States, residing at Chicago, in the county of Cook and State of Illinois, have invented certain new and useful Improvements in Pumps, of which the following is a specification.

My invention relates to improvements in pumps, and more particularly, in some features, to small air pumps intended to be power driven, such for example as those used on automobiles.

Among the objects of my invention are the following: to provide a pump construction which is simple, efficient, and durable, composed of a minimum number of symmetrical parts for cheap and easy manufacture; to provide a pump wherein the action is perfectly balanced, and wherein the frictionally-coacting surfaces are disposed for minimum wear and adequate bearing, to afford a construction wherein lubrication requirements are minimized and suitable lubrication is easily effected; to provide a pump which may be assembled or taken apart quickly and without the use of tools.

Other and further objects of my invention will become apparent to those skilled in the art from the following description taken in conjunction with the accompanying drawings in which—

Figure 1 is a central, vertical section on line 1—1 of Fig. 2; Fig. 2 is a plan view, and Fig. 3 is an enlarged detail of a spring-saddle clip.

Referring to the particular construction shown in the drawing, the pump piston 10, of trunk or cup shape, carrying in its head a suitable intake valve, I, reciprocates in the cylinder portion 11 of the casing that has in its head the outlet valve O. The structural details of valves I and O form no part of my present invention, but I prefer that the piston carried valve I be designed to lie flush with the piston end when closed. Also I prefer that, in rear of the valve I there be set a protective screen 12 of wire mesh, buckled slightly and sprung into a retaining groove 12′ in the piston.

In rear of the cylinder 11 I prefer that the casing be enlarged as at 13, cylindrically, that its internal diameter may be increased in the base chamber 14, thus minimizing the area that need be machined for piston reception, minimizing the area of piston lubrication, and affording ample space for the piston driving parts.

The rear end of the casing, structurally open, and internally screw threaded as at 15, receives a bearing head 16 screwed into place for ready removal and centrally affording the bearing for an axial shaft element. Preferably this head has set therein a hardened race-way for the large ball-bearing 17, the opposite ball-race being provided on the head 19 of a short hollow shaft 18 of large diameter that passes freely through a suitable opening in the head 16. Externally the shaft carries means for its rotation, in the form of a gear 20, drive fitted, keyed, or otherwise secured thereon, and within the chamber 14 the shaft head 19 has bearing studs 21 in which is mounted, preferably non-rotatably, a transverse axle 22. Ball bearing rollers 23 on this axle coöperate with a crown-cam surface 24 forming the end of the piston wall, the cam being provided with two (or a multiple of two) symmetrically opposed rises smoothly curved and preferably shaped for comparatively rapid acceleration during the first part of the instroke of the piston and decreasing velocity of movement as the piston approaches the end of its instroke.

The piston is maintained against rotation in its cylinder and is provided with resilient means for maintaining its cam surface constantly in contact with the driving rollers. In the specific construction shown a cross pin 25 extends through the piston diametrically, preferably in the deepest part of the cam conformation, and projects through the casing wall, preferably at its top and bottom, for coöperation with springs that are arranged exteriorly to the casing. Specifically I prefer that the pins shall have rounded heads 26 engaging the piston and flattened blades 27 therebeyond, these blades sliding in longitudinal slots 28 in the casing wall, said slots at their rear ends being enlarged, buttonhole fashion, as at 29, for passage of the pin heads 26. The pin 25 is exteriorly keyed, at each end, by the saddle clip 30 that has an arcuate groove head 31 and a two pronged key portion 32, said key portion straddling the blade 27 of the pin and seating in a notch 33 made therein. A retractile coil spring 34 is bent around the saddle 31, seating in its groove, and at its ends has eyes that engage pins 35 that project inwardly from a border frame 36 that encompasses the projecting parts, to form an external spring chamber or recess.

In operation it will be obvious that for each rotation of the shaft 18 the piston will be twice reciprocated; the rollers always acting in unison on symmetrical parts of the cam, advance the cam and the spring loops retract it. Rotation of the piston is prevented by the guided cross-pin 25. The valve I of course opens on the outstroke of the piston, taking into the cylinder air from the casing base clarified by the screen, and on the piston instroke valve I closes while valve O opens. The relatively large diameter of the piston gives adequate capacity under even a short stroke, and the comparatively short stroke with its concomitant easy pitch of the cam-rises facilitates high speed operation.

To take to pieces the construction specifically illustrated, the casing head 16, carrying the shaft with its appurtenant gear member and driving rollers, is first unscrewed; the piston is drawn back beyond the limits of its normal throw so that cross pin 25 registers with the buttonhole enlargement 29, the saddle-clips 30 are slipped out of engagement with the recesses 33 of the pin, and the pin 25 is pulled out transversely. Thereupon the piston may readily be removed. In assembling, of course, these operations are reversed.

It will be observed that with a construction as above described all of the first mentioned desiderata of my invention are attained. The number of parts employed is small, and the parts themselves are rugged, simple and cheap to manufacture. The perfect balance that is at all times retained prevents unevenness of wear, and by the arrangement employing a short piston of large diameter, with its crown cam coöperating with the widely separated rollers 33, cam conformation may be made very "easy" and wear between these parts minimized, while extension of the rotation-preventing sliding connections of the piston and cylinder to points beyond the diameter of the piston, and distribution of the friction over the relatively wide blade surfaces minimizes wear in this particular. The looped return springs are long, ride in an easy curve on the saddle clips, and their maximum extension is so well within their elastic limits that crystallization-tendency is practically negligible and the springs are very enduring. For lubrication, the cylinder, the rollers, and the slide bearings may all be directly reached through the slideway slots 28, and are also adequately accessible through the hollow shaft.

It will be understood by those skilled in the art that while, for purposes of full disclosure of a highly advantageous embodiment of my invention I have described in some detail a particular construction involving numerous refinements that I considered to be of advantage and that may claim for their superiority, numerous departures from the specific construction shown might be made without departure from the spirit of my invention and within the scope of the appended claims.

Having described my invention, what I claim is:

1. In a pump, the combination of a casing providing a cylinder, a piston member in said cylinder, means comprising a pin and slot connection between the piston and the cylinder wall to prevent rotation of the piston, a rotatable driving member carried by the casing, one of said members having a cam surface for reciprocation of the piston member by rotation of said driving member, and resilient means maintaining said members in engagement.

2. In a pump, the combination of a casing providing a cylinder, a piston therein having a crowned cam with multiple rises symmetrically disposed, a rotatable element coaxial with the piston having parts symmetrically disposed coacting equally with the multiple cam surfaces, means comprising a pin and slot connection between the piston and cylinder wall for preventing rotation of said piston with respect to the cylinder, and resilient means acting on said piston to hold its cam in constant engagement with said parts of the rotatable member.

3. In a pump, the combination of a casing providing longitudinal guide openings, a piston therein provided with a multiple rise crown cam, means on said piston extending through said guide openings to prevent rotation of the piston, springs acting on said means to move said piston on its outstroke, an axially disposed rotatable member, and symmetrically disposed driving parts on said member coacting equally with the multiple rises of the cam.

4. In a pump, the combination of an open ended tubular casing providing a cylinder, a piston therein non-rotatable with respect thereto, a hollow rotatable member coaxial with said piston and mounted in the open end of the casing, said piston and rotatable member being provided with coöperating multiple contact parts and multiple-crown cam surfaces symmetrically disposed with respect to the axis of the structure, means constantly maintaining said parts in engagement and a check valve in said piston opening inwardly to the cylinder.

5. In a pump of the character described, the combination of a casing providing longitudinal slots, a piston reciprocable in said casing carrying parts projecting through said slots to prevent rotation of the piston, springs externally acting on said parts tending constantly to move said piston to the end of its outstroke, a rotatable, axially-immovable driving member coaxial with said piston, said driving member and piston having coöperating roller and cam means.

6. In a pump the combination of a casing, having a cylinder, a piston in said cylinder, means positively to move said piston on its instroke, parts on said piston extending through the casing slots, and external coiled springs looped around said parts tending constantly to move said piston to the extremity of its outstroke.

7. In a pump the combination of a casing, having a cylinder, a piston in said cylinder, means positively to move said piston on its instroke, parts on said piston extending through the casing slots, saddle members having arcuate heads connected with said parts, and coiled springs looped around said saddle members and secured at opposite extremities, for tending constantly to move said piston to the limit of its outstroke.

8. In a pump the combination of a casing, having a cylinder, a piston in said cylinder, means positively to move said piston on its instroke, parts on said piston extending through the casing slots, saddle members having arcuate heads detachably connected with said parts, and coiled springs looped around said saddle members and secured at opposite extremities, for tending constantly to move said piston to the limit of its outstroke.

9. In a pump of the character described, the combination of a casing providing a cylinder, and external spring chambers, there being button-hole slots through the walls of said casing, a piston in said cylinder, a cross pin having heads and blades, said blades extending through said button-hole slots, saddle clips detachably connected with said blades, coil spring loops within said spring-chambers centrally looped around said saddles and secured at their extremities and constantly tending to retract said piston, and means for advancing said piston.

10. In a pump of the character described, the combination of a casing providing a cylinder, and external spring chambers, there being button-hole slots through the walls of said casing, a piston in said cylinder, a cross pin having heads and blades, said blades extending through said button-hole slots, saddle clips detachably connected with said blades, coil spring loops within said spring-chambers centrally looped around said saddles and secured at their extremities and constantly tending to retract said piston, and means for advancing said piston comprising an axially disposed rotatable member having a transverse axle carrying rollers, said piston having its edge formed in a crown cam symmetrically shaped and coacting with said rollers.

11. In a pump of the character described, the combination of a casing, at one end providing a cylinder with its other end providing a threaded opening, a head for closing said opening, a tubular shaft mounted for rotation in said head, an external gear on said shaft, a transverse axle carried by said shaft, bearing rollers at the axle extremities, a piston in said cylinder having a double-rise crown cam operating against said rollers, means for preventing rotation of said piston with respect to the cylinder, and means for resiliently maintaining said piston-cam in constant contact with said rollers.

12. In a pump, the combination of an open ended tubular casing providing a cylinder, a piston therein non-rotatable with respect thereto, a hollow rotatable member coaxial with said piston and rotatably mounted in the open end of the casing, said piston and rotatable member being provided with co-operating multiple contact parts and multiple crown cam surfaces symmetrically disposed with respect to the axis of the structure, means constantly maintaining said parts in engagement, a check valve in said piston opening inwardly to the cylinder, and a circular screen positioned within the piston and engaging the inner wall of the piston throughout its periphery.

13. In a pump, the combination of a cylinder having an axially slotted wall, one end of the slot being enlarged, a piston within the cylinder having an opening adapted to register with the slot, a pin adapted to pass through the opening in the piston and the enlarged end of the slot, said pin having a reduced portion adapted to slide within the smaller portion of the slot, and a shoulder on the pin adapted to engage the cylinder wall adjacent the smaller portion of the slot and prevent transverse movement of the pin.

14. In a pump, the combination of a cylinder, a piston therein, a spring adapted to move the piston axially in one direction, the piston and cylinder having openings therein, adapted to register, a removable pin adapted to engage said openings and prevent rotation of the piston, removable rotary means adapted to move the piston in a direction opposite to the spring impelled movement, and means whereby upon application of the rotary means to the pump the pin will be locked against transverse movement.

In testimony whereof I hereunto set my hand in the presence of two subscribing witnesses.

WILLIS A. SWAN.

In the presence of—
  STANLEY W. COOK,
  MARY Y. ALLEN.